(12) United States Patent
Zhang et al.

(10) Patent No.: US 8,744,070 B2
(45) Date of Patent: Jun. 3, 2014

(54) USER DEVICE

(75) Inventors: Bin Zhang, Shenzhen (CN); Jianjun Xiao, Shenzhen (CN); Menglong Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 327 days.

(21) Appl. No.: 13/270,053

(22) Filed: Oct. 10, 2011

(65) Prior Publication Data

US 2012/0106066 A1 May 3, 2012

Related U.S. Application Data

(63) Continuation of application No. PCT/CN2011/077999, filed on Aug. 4, 2011.

(30) Foreign Application Priority Data

Aug. 12, 2010 (CN) .......................... 2010 1 0253592
Sep. 19, 2010 (CN) .......................... 2010 1 0290497

(51) Int. Cl.
  *G06F 1/16* (2006.01)

(52) U.S. Cl.
  USPC .............. 379/433.13; 361/679.32; 455/575.1; 455/575.3

(58) Field of Classification Search
  None
  See application file for complete search history.

(56) References Cited

U.S. PATENT DOCUMENTS

| | | | |
|---|---|---|---|
| 7,418,279 B2 * | 8/2008 | Takagi ......................... | 455/575.1 |
| 7,824,186 B2 * | 11/2010 | Zhao et al. ...................... | 439/13 |
| 2002/0078529 A1 * | 6/2002 | Schwarz .......................... | 16/387 |
| 2004/0229478 A1 * | 11/2004 | Chen ............................... | 439/11 |
| 2005/0225093 A1 | 10/2005 | Zuo et al. | |
| 2006/0084284 A1 * | 4/2006 | Hsieh .............................. | 439/31 |
| 2006/0123593 A1 | 6/2006 | Shiba | |
| 2009/0280874 A1 * | 11/2009 | Kosugi et al. .............. | 455/575.3 |
| 2010/0037430 A1 | 2/2010 | Wang et al. | |
| 2011/0034048 A1 * | 2/2011 | Zhao et al. .................... | 439/131 |

FOREIGN PATENT DOCUMENTS

| | | |
|---|---|---|
| CN | 2651394 Y | 10/2004 |
| CN | 2760908 Y | 2/2006 |
| CN | 1764359 A | 4/2006 |

(Continued)

OTHER PUBLICATIONS

Office Action issued in corresponding Chinese Patent Application No. 201010290497.7, mailed Nov. 21, 2011.

(Continued)

*Primary Examiner* — Anthony Q Edwards
(74) *Attorney, Agent, or Firm* — Brinks Gilson & Lione

(57) ABSTRACT

The embodiments of the present disclosure provide a user device, which includes a main body part, a movable part electrically connected with the main body part, and a switching control unit and a rotation driver unit for co-axially connecting the main body part with the movable part. The switching control unit is used for eliminating a friction that enables the main body part to be fixed relative to the movable part fixed to turn on a rotation mode of the movable part. The rotation driver unit is used for applying a pre-pressing elastic force to the movable part when the switching control unit turns on the rotation mode of the movable part, so as to enable the movable part to automatically rotate relative to the main body part. The pre-pressing elastic force is less than the friction.

19 Claims, 9 Drawing Sheets

(56) References Cited

FOREIGN PATENT DOCUMENTS

| CN | 1791317 | A | 6/2006 |
|---|---|---|---|
| CN | 201064053 | Y | 5/2008 |
| CN | 101951745 | A | 1/2011 |
| EP | 1684491 | A2 | 7/2006 |
| EP | 2096724 | A1 | 9/2009 |
| JP | 10-311327 | A | 11/1998 |
| JP | 2001-251398 | A | 9/2001 |
| JP | 2003-065320 | A | 3/2003 |
| JP | 3135445 | U | 8/2007 |

OTHER PUBLICATIONS

European Search Report issued in corresponding European Patent Application No. 11763829.6, mailed Apr. 10, 2013.

Written Opinion of the International Searching Authority issued in corresponding PCT Patent Application No. PCT/CN2011/077999, mailed Nov. 17, 2011.

Office Action issued in corresponding Japanese Patent Application No. 2012-528223, mailed Apr. 2, 2013.

* cited by examiner

US 8,744,070 B2

USER DEVICE

CROSS-REFERENCE TO RELATED APPLICATIONS

This application is a continuation of International Application No. PCT/CN2011/077999, filed on Aug. 4, 2011, which claims priority to Chinese Patent Application No. 201010253592.X, filed on Aug. 12, 2010 and Chinese Patent Application No. 201010290497.7, filed on Sep. 19, 2010, all of which are hereby incorporated by reference in their entireties.

FIELD OF THE DISCLOSURE

The present disclosure relates to communication technology, and in particular, to a user device with an automatic rotation structure.

BACKGROUND

With the continuous development of communication technology, various user devices, such as handsets, data cards, U-disks, etc, have more and more functions and shapes.

A rotation structure may be disposed on a current user device, so that a rotatable part of the user device may rotate relative to the main body of the user device. For example, the rotation structure may be disposed on a lid-turning handset, a data card with a USB connector or a U-disk, so that the lid of the lid-turning handset or the USB connector of the data card and the U-disk may be opened by external force and rotate. In prior art, the rotation structure is a mechanical rotation axle. Taking a U-disk with a rotatable USB connector as an example, the U-disk comprises a U-disk main body and a USB connector electrically connected to the U-disk main body. One end of the mechanical rotation axle is connected to the U-disk main body, the other end of the mechanical rotation axle is connected with the USB connector. The USB connector can be moved by external force and can rotate around the mechanical rotation axle relative to the U-disk main body. In this way, the rotation of the USB connector is realized.

In the above user device, the rotatable part cannot be moved and rotate unless the user continuously applies an external force on it, which impairs the user operability.

SUMMARY

The embodiments of the present disclosure provide a user device to realize better user operability.

The present disclosure provides a user device, and the user device includes: a main body part and a movable part electrically connected with each other, and a switching control unit and a rotation driver unit for co-axially connecting the main body part and the movable part.

The switching control unit is configured to eliminate the friction fixes the main body part relative to the movable part, under the influence of an external force, to turn on the rotation mode of the movable part.

The rotation driver unit is configured to apply a pre-pressing elastic force on the movable part when the switching control unit is turning on the rotation mode of the movable part, so that the movable part automatically rotate relative to the main body part, where the pre-pressing elastic force is less than the friction.

By providing the switching control unit and the rotation driver unit, the user device of the present device may enable the user to apply an external force to the switching control unit when the user needs to rotate the movable part, to eliminate the friction that enables the main body part to be fixed relative to the movable part, so that the rotation mode of the movable part is turned on. In this way, the movable part can rotate around the main body part, under the influence of the pre-pressing elastic force of the rotation driver unit. And there is no need for the user to mechanically move the movable part during the course of the rotation, so that the user device has a relatively good operability.

DESCRIPTION OF THE DRAWINGS

Accompanying drawings for explaining the embodiments of the disclosure or the prior arts are briefly described, for the purpose of explaining the embodiments of the present disclosure or of the prior arts more clearly. Obviously, the drawings as described in the following merely illustrate some embodiments of the present disclosure. For those skilled in the art, other drawings can be derived in accordance with these drawings, without any creative effort.

DETAILED DESCRIPTION OF THE EMBODIMENTS

Figure 1:
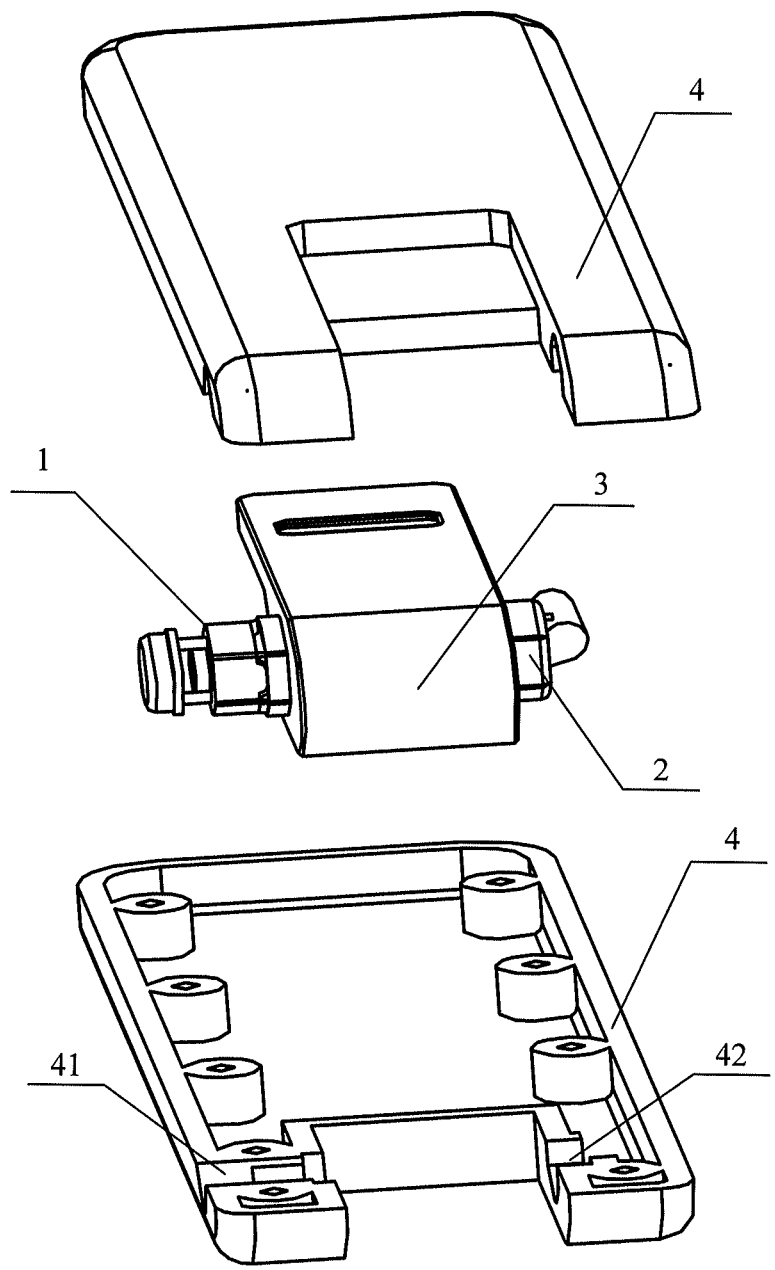
FIG. 1 is an exploded structural view of the user device according to an embodiment of the present disclosure.

To make the purposes, characteristics and benefits of the embodiments of the present disclosure clearer and easier to understand, the embodiments of the present disclosure are clearly and fully described with reference to the accompanying drawings. Apparently, the embodiments described herein are merely part of, rather than all of the embodiments of the present disclosure. All other embodiments made without creative effort by a person of ordinary skill in the art, based on the embodiments of the present disclosure, fall within the protection scope of the present disclosure.

According to an embodiment of the present disclosure, a user device may include a main body part and a movable part electrically connected with each other, and a switching control unit and a rotation driver unit for co-axially connecting the main body part and the movable part. The switching control unit is configured to eliminate the friction enabling the main body part to be fixed relative to the movable part to turn on the rotation mode of the movable part, under the influence of an external force; the rotation driver unit is configured to apply a pre-pressing elastic force when the switching control unit turns on the rotation mode of the movable part, to enable the movable part to rotate around the main body part, where the pre-pressing elastic force is less than the friction.

For example, the switching control unit and the rotation driver unit in the embodiment may be disposed at the two sides of the main body part opposing each other, or may be disposed on the same side of the main body part. The direction for connecting the switching control unit and the rotation driver unit is the direction of the rotation axis of the movable part. When the switching control unit is not subject to an external force, it may turn off the rotation mode of the movable part, that is, it may enable the movable part to be fixed relative to the main body part. When the switching control unit is subject to an external force, the switching control unit may turn on the rotation mode of the movable part, that is, it may enable the movable part to be movable relative to the main body part. In this mode, the rotation driver unit may apply a pre-pressing elastic force on the movable part, so that the movable part may autonomously rotate relative to the main body part, with the switching control unit and the rotation driver unit as the rotation axle. That is, without further exerting an external force, the movable part may rotate relative to the main body part.

In one example, the switching control unit in the embodiment can control whether to turn on the rotation mode of the movable part by controlling a friction that enables the main body part to be fixed relative to the movable part. When the switching control unit is subject to an external force, the switching control unit may eliminate the friction that enables the main body part to be fixed relative to the movable part, so that the movable part can rotate relative to the main body part, that is, turn on the rotation mode of the movable part. As the pre-pressing elastic force provided by the rotation driver unit is less than the friction that enables the main body part fixed relative to the movable part, when subjecting to the friction that enables the main body part fixed relative to the movable part, the switching control unit may turn off the rotation mode of the main body part and the movable part. In operation, by applying an external force to the switching control unit, the user can eliminate the friction that enables the main body part to be fixed relative to the movable part. When the friction between the main body part and the movable part is eliminated, the rotation driver unit may apply a pre-pressing elastic force to the movable part, so that the movable part may rotate relative to the main body part under the influence of the pre-pressing elastic force.

Taking an example where the user device is a lid-turning handset. The main body part is the handset body on which a keypad part is disposed, and the movable part is the lid-turning part on which a display screen is disposed, where the handset body part is electrically connected with the lid-turning part. A switching control unit and a rotation driver unit may co-axially connect the handset body with the lid-turning part. When the handset is not in use, under the influence of a friction that enables the lid-turning part to be fixed relative to the handset body, the handset body and the lid-turning part are closed. When it needs to rotate and lift the lid-turning part, the user can apply an external force to the switching control unit. Under the influence of the external force, the switching control unit can eliminate the friction that enables the main body part to be stationary relative to the movable part, so as to turn on the rotation mode of the lid-turning part. Further, the rotation driver unit can apply a pre-pressing elastic force to the lid-turning part when the rotation mode is turned on. Therefore, under the influence of the pre-pressing elastic force, the lid-turning part may automatically rotate relative to the handset body.

During specific implementation, the pre-pressing elastic force may be implemented through a spring's pre-tightening force. Of course, the pre-pressing elastic force may be implemented through other ways, such as through elastic deformation of an elastic trip.

It can be understandable that the user device in the embodiment may be other user device provided with a movable part, such as a U-disk or a data card with a rotatable USB connector, etc.

The above embodiments of the present disclosure do not limit the specific structure of the switching control unit and the rotation driver unit. Persons of ordinary skill in the art can design as needed its specific structure to realize the switching control function and rotation driver function. Therefore, it is not needed to move the movable part during the rotation of the movable part.

For the user devices of the above embodiments of the present disclosure, by disposing a switching control unit and a rotation driver unit, when a user needs to rotate the movable part, the user may apply an external force to the switching control unit, to eliminate the friction that enables the main body part and the movable part to be stationary to each other, and therefore the rotation mode of the movable part is turned on. In this way, under the influence of a pre-pressing elastic force of the rotation driver unit, the movable part may automatically rotate relative to the main body part, and does not need to be mechanically actuated by a user during the rotation. Thus, the user device has a relatively good operability.

Further, based on the above embodiments, another embodiment of the user device of the present disclosure provides an optional implementation way in which a switching control unit and a rotation driver unit are disposed on two sides of the main body part of the user device and are connected with the user device. In particular, a first mounting hole and a second mounting hole are disposed on two sides of the movable part. A first accommodation part is disposed at the location corresponding to the mounting hole, and a second accommodation part is disposed at the location corresponding to the second mounting hole on the main body part. The switching control unit is connected to the first accommodation part and the first mounting hole. The rotation driver unit is connected to the second accommodation part and the second mounting hole.

It should be noted that the first and second mounting holes can either be independent holes provided on the two sides of the movable part, or holes interconnected with each other. The first and second accommodation parts can either be in the form of grooves, or in the form of through holes.

In particular, in the user device of the present disclosure, the switching control unit can penetrate and be installed in the first accommodation part of the main body part and the first mounting hole of the movable part, whereas the rotation driver unit can penetrate and be installed in the second accommodation part of the main body part and the second mounting hole of the movable part. Therefore, both the switching control unit and the rotation driver unit are provided along the direction of the rotation axis of the movable part. The switching control unit can control turn on and turn off of the rotation mode of the movable part. The rotation driver unit can apply a pre-pressing elastic force needed by the automatic rotation to the movable part.

In another embodiment of the user device of the present disclosure, the above switching control unit may comprise a switching element and an arrester element connected to the switching element. The switching element is exposed to the outer side of the main body part, and the arrester element penetrates and is installed in the first accommodation part and the first mounting hole. The arrester element is used to eliminate the friction that enables the main body part and the movable part to be stationary to each other, under the influence of the external force the switching element withstands.

In the present embodiment, the switching element can be a push button or a slide switch, etc. The user can apply an external force to the arrester element by pressing the push button or sliding the slide switch, to enable the arrester element to eliminate the friction that enables the main body part and the movable part to be stationary to each other, so that the movable part rotates relative to the main body part, under the influence of a pre-pressing elastic force of the rotation driver unit.

In the following, a data card with a rotatable USB connector will be used as the user device to describe the present disclosure in detail.

Figure 2:
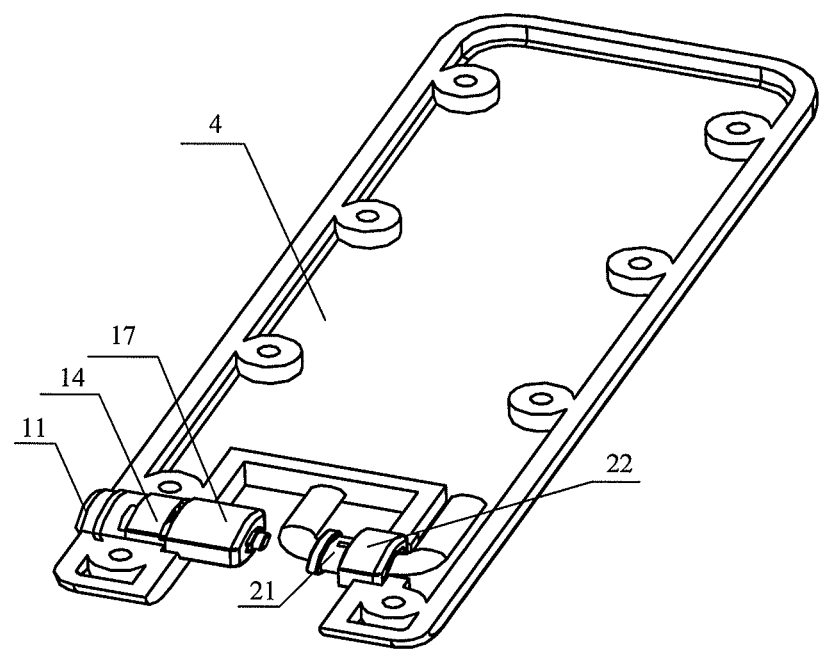
FIG. 2 is a partial structural view of the user device as shown in FIG. 1.
Figure 3:
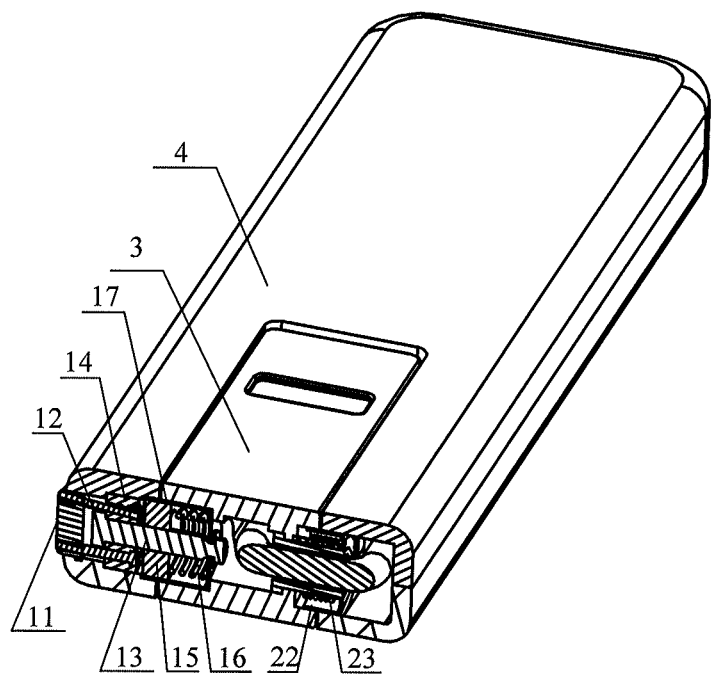
FIG. 3 is a cross-section structural view of the user device as shown in FIG. 1 along the direction of a rotation axis of a movable part.
Figure 4:
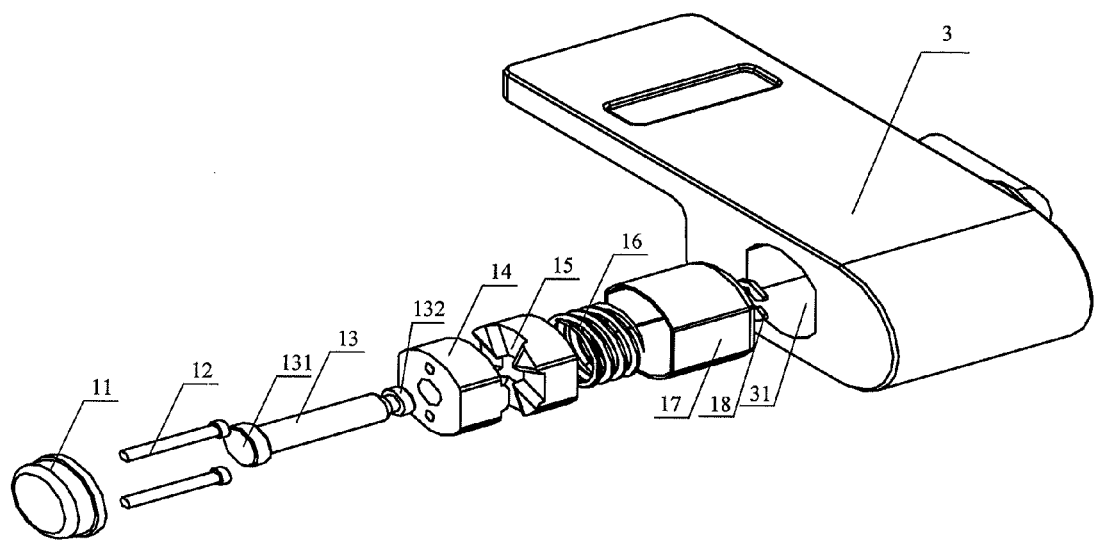
FIG. 4 is an exploded structural view of a switching control unit in the user device as shown in FIG. 1.
Figure 5:
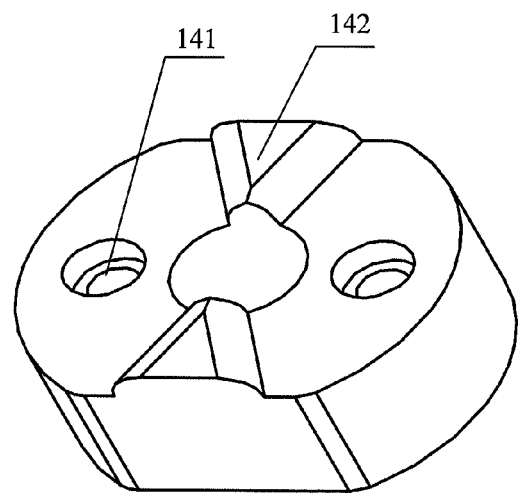
FIG. 5 is a structural view of a cam in the switching control unit as shown in FIG. 4.
Figure 6:
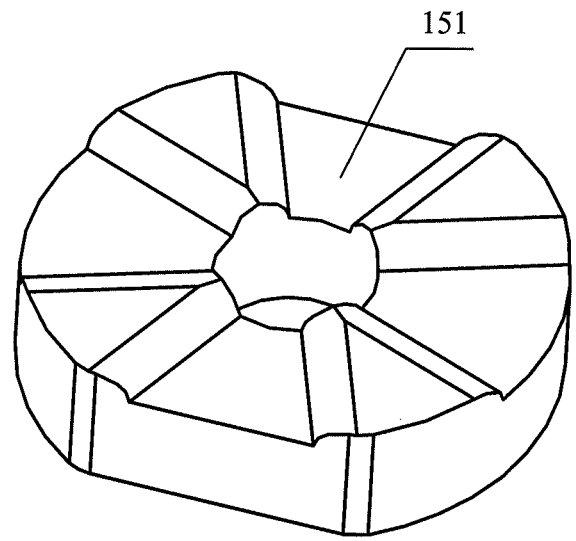
FIG. 6 is a structural view of a recessed part matched with the cam as shown in FIG. 5.
Figure 7:
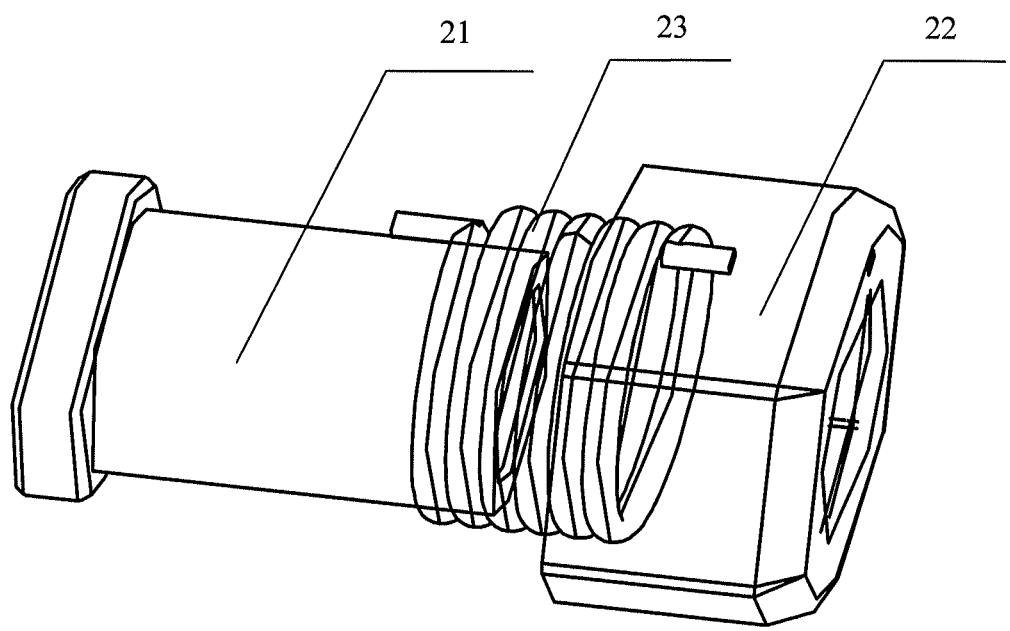
FIG. 7 is an exploded structural view of a rotation driver unit in the user device as shown in FIG. 1.
Figure 8:
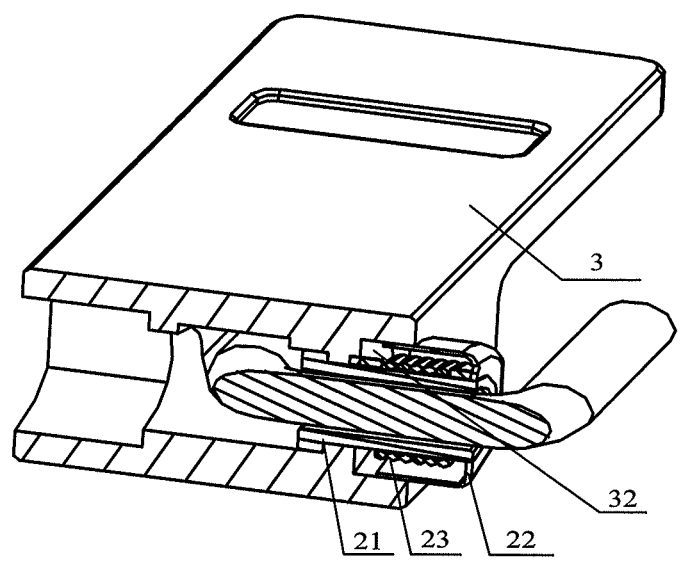
FIG. 8 is a cross-section structural view of the connection between the rotation driver unit as shown in FIG. 7 and the movable part.

FIG. 1 is an exploded structural view of the user device according to an embodiment of the present disclosure. FIG. 2 is a partial structural view of the user device as shown in FIG. 1. FIG. 3 is a cross-section structural view of the user device as shown in FIG. 1 along the direction of the rotation axis of the movable part. FIG. 4 is an exploded structural view of the switching control unit in the user device as shown in FIG. 1. FIG. 5 is a structural view of a cam in the switching control unit as shown in FIG. 4. FIG. 6 is a structural view of a recessed part matched with the cam as shown in FIG. 5. FIG. 7 is an exploded structural view of a rotation driver unit in the user device as shown in FIG. 1. FIG. 8 is a cross-section structural view of the connection between the rotation driver unit as shown in FIG. 7 and a movable part. As shown in FIGS. 1-8, in the embodiment, a first mounting hole 31 and a second mounting hole 32 are disposed on two sides of a movable part 3. A first accommodation part 41 is disposed at a location on a main body part 4 corresponding to the first mounting hole 31. A second accommodation part 42 is disposed at a location on the main body part 4 corresponding to the second mounting hole 32. A switching control unit 1 includes a push button 11, two push rods 12, a first fixation axle 13, a cam wheel 14, a recessed wheel 15, a first spring 16, a first axle sleeve 17 and a snap ring 18. A first termination part 131 and a second termination part 132 are disposed at two ends of the first fixation axle 13. Two through holes 141 and two protrusion fields 142 are disposed on the cam wheel 14. Recessed fields 151 that are matched with the protrusion fields 142 are disposed on the recessed wheel 15. The cam wheel 14, the recessed wheel 15, the first spring 16, the first axle sleeve 17 and the snap ring 18 are penetrated and installed in sequence between the first termination part 131 and the second termination part 132, and the snap ring 18 is fixed onto the second termination part 132. The protrusion fields 142 and the recessed fields 151 are disposed to face each other. The inner radius of the first axle sleeve 17 is larger than the outer radius of the recessed wheel 15. One end of each of the two push rods 12 is adhered to and mated with the push button 11, while another end of each of the two push rods 12 is adhered to and mated with the recessed wheel 15 through a through hole 141. The first axle sleeve 17 is tightly mated with the first mounting hole 31. The cam wheel 14 is tightly mated with the first accommodation part 41. And the push button 11 is exposed to the outside of the main body part 4. The first spring 16 is in a compressed status when the movable part 3 is shut off, so that the cam wheel 14 and the recessed wheel 15 are tightly adhered to each other under the influence of the elastic force of the first spring 16. The rotation driver unit 2 includes a second fixation axle 21 that is hollow, a second axle sleeve 22, and a second spring 23. The second fixation axle 21 is penetrated and installed in the second mounting hole 32, and one end of the second fixation axle 21 is adhered to the inner side of a movable part 3. The second spring 23 and the second axle sleeve 22 are installed onto and circumferentially cover another end of the second fixation axle 21. The second axle sleeve 22 is installed onto and circumferentially covers the second spring 23. One end of the second spring 23 is connected to the second axle 22, and another end of the second spring 23 is connected to the inner side of the second mounting hole 32. The second axle sleeve 22 and the second accommodation part 42 are tightly mated with each other. The second spring 23 is in a compressed status when the movable part 3 is shut off. The cable electrically connecting the movable part 3 and the main body part 4 can pass through the hollow part of the second fixation axle 21 and connect with the print circuit board of the main body part 4. In this embodiment, a draw spring can be used as the first spring 16, while a torsion spring can be used as the second spring 23. In the embodiment, the USB connector of the data card can electrically connect with the print circuit board (hereinafter "PCB") within the housing by a cable. Further, the cable can pass through the second axle sleeve 22 and connect the ground of the USB connector to the ground on the PCB. In addition, the first fixation axle 13 is made of metal, and can also connect the ground of the USB connector to the ground on the PCB. Thus, simultaneous grounding of the USB connector of the data card and the PCB on right and left sides, i.e., a dual grounding, can be realized by the cable and the first fixation axle 13. A person skilled in the art can understand that, the embodiment can also take the form of single grounding, that is, the ground of the USB connector can be connected to the ground on the PCB by the cable or the first fixation axle 13.

It should be noted that, the embodiment merely takes two push rods as an example for description. A person skilled in the art can understand that, in the present embodiment, more through holes 141 can be disposed on the cam wheel 14 according to the structure of the cam wheel 14 to pass through more push rods 12, so as to enlarge the contact area between the push rods 12 and the recessed wheel 15, and enhance the reliability of the push button 11's operations.

Figure 9:
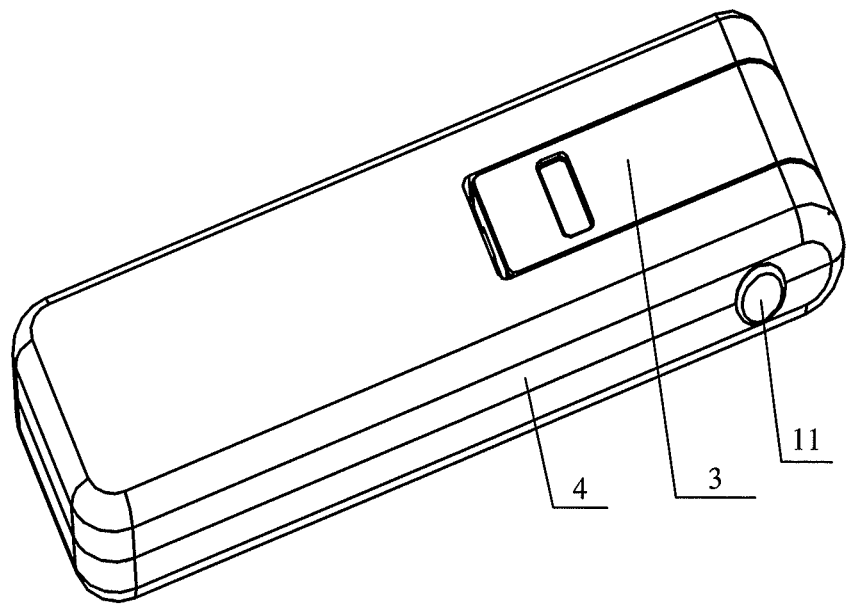
FIG. 9 is a structural view of the user device when the rotation mode of the movable part is turned off according to an embodiment of the present disclosure.

FIG. 9 is a structural view of the user device of the present disclosure when the movable part is in a mode where the rotation mode is turned off.

Figure 10:
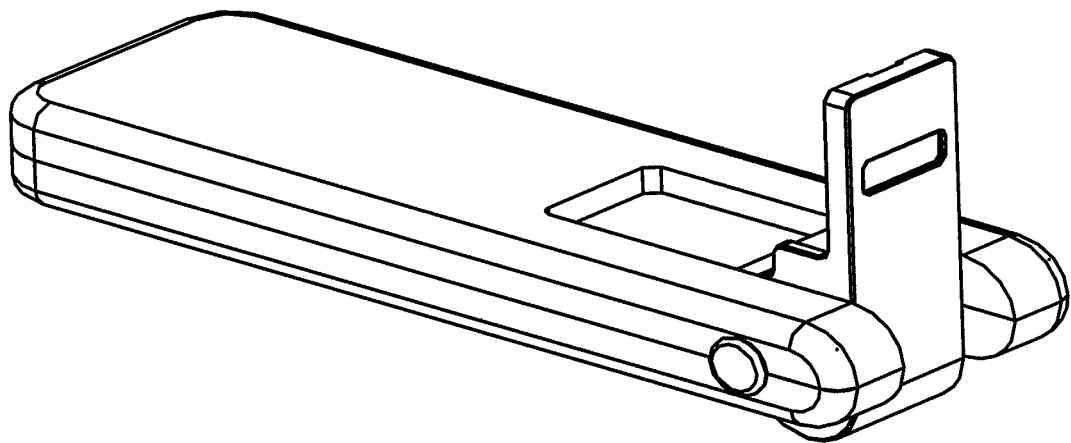
FIG. 10 is a structural view of the user device as shown in FIG. 9 when the rotation part rotates to an angle of 90 degrees.
Figure 11:
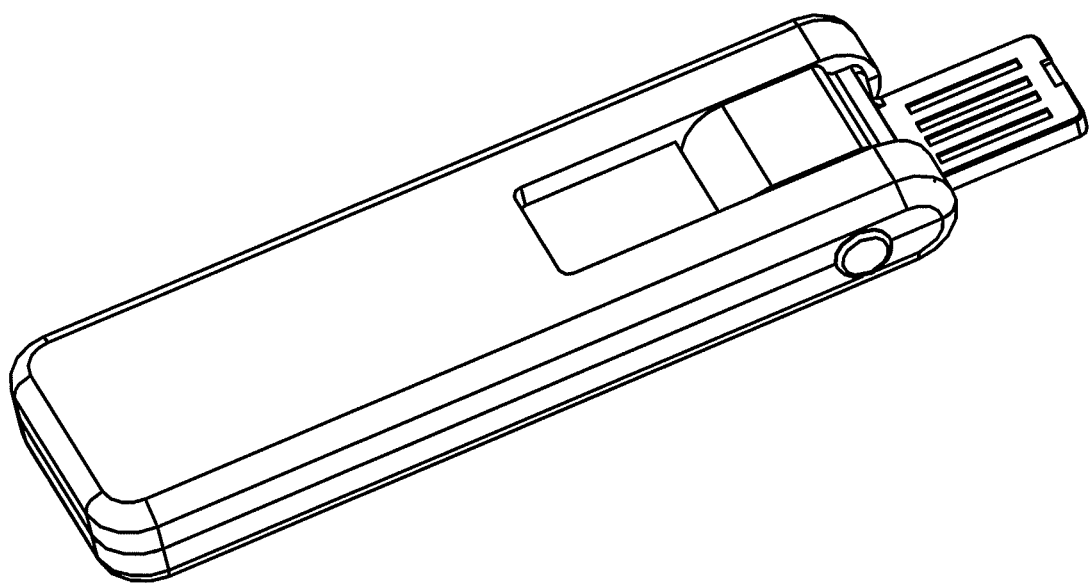
FIG. 11 is a structural view of the user device as shown in FIG. 9 when the rotation part rotates to an angle of 180 degrees.
Figure 12:
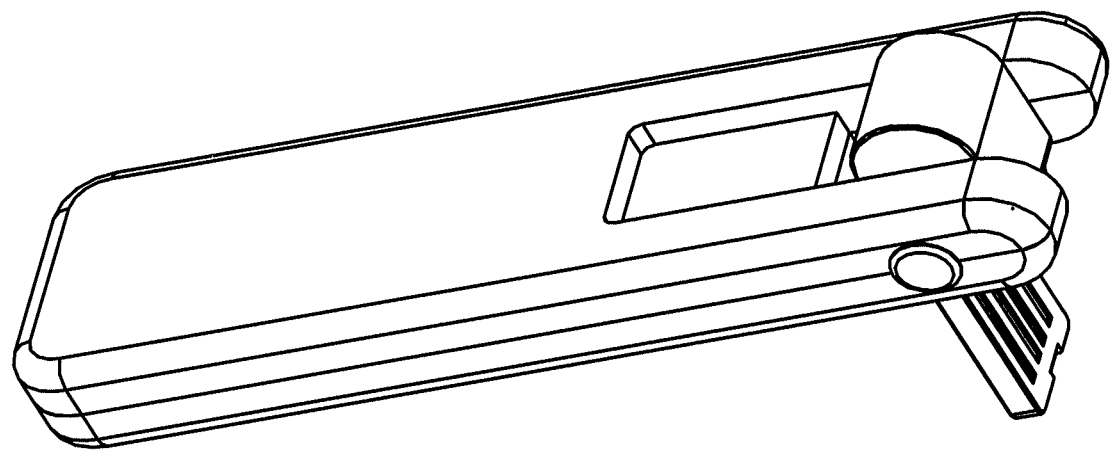
FIG. 12 is a structural view of the user device as shown in FIG. 9 when the rotation part rotates to an angle of 270 degrees.

FIG. 10 is a structural view of the user device as shown in FIG. 9 when the rotation part rotates to an angle of 90 degrees. FIG. 11 is a structural view of the user device as shown in FIG. 9 when the rotation part rotates to an angle of 180 degrees. FIG. 12 is a structural view of the user device as shown in FIG. 9 when the rotation part rotates to an angle of 270 degrees. As shown in FIGS. 9-12, and referring to the above FIGS. 1-8, specifically, when the movable part 3 is in a status where the rotation mode is turned off, for example, in the status of 0 degree, the second spring 23 of the rotation driver unit 2 is in a maximum pre-pressing state. That is, the second spring 23 has the pre-pressing elastic force capable of driving the movable part 3 to rotate. The embodiment denotes the pre-pressing elastic force of the second spring as T1. Further, the first spring 16 of the switching control unit 1 may have a certain quantity of pre-pressing elastic force, too, so that the cam wheel 14 and the recessed wheel 15 are pre-pressed together to enable the cam wheel 14 to be fixed relative to the recessed wheel 15. The embodiment denotes the relative friction between the cam wheel 14 and the recessed wheel 15 as T2. Therefore, when the rotation mode is turned off, T2 needs to be greater than T1 to ensure that when the cam wheel 14 is tightly mated with the recessed wheel 15 the relative friction between the cam wheel 14 and the recessed wheel 15 can prevent the second spring 23 of the rotation driver unit 2 from enabling the movable part 3 to rotate.

After pressing or sliding the push button 11, the two push rods 12 will push the recessed wheel 15 in the direction of the axis center of the first fixation axle 13 and force the recessed wheel 15 to press the first spring 16, so as to separate the recessed wheel 15 from the cam wheel 14. This action of separation is equivalent to turning on the rotation mode of the movable part. After the relative friction T2 between the cam wheel 14 and the recessed wheel 15 is eliminated, the second spring 23 can be twisted under the influence of the pre-pressing elastic force T1. That is, the movable part 3 is caused to rotate, until the second spring 23 is fully relaxed or the push button 11 is released, the movable part 3 stops rotating. It should be noted that a person skilled in the art can set the rotation angle of the movable part 3 when the second spring is fully relaxed, so as to cater to the requirements of different user devices. For example, for the data card of the embodiment, the rotation angle of the USB connector can be set to 180 degrees when the second spring 23 is fully relaxed. However, for a handset, the rotation angle of the lid-turning part can be set to 160 degrees when the second spring 23 is fully relaxed.

After releasing the push button, the recessed wheel 15 will be pressed by the first spring 16 and returns to the state that the recessed wheel 15 is tightly mated with the cam wheel 14. At this time, the two push rods of the switching control unit 1 returns to its original state. Since at this time a relative friction T2 exists when the recessed wheel 15 is tightly mated with the cam wheel 14, the movable part 3, i.e., the USB connector, will stop rotating and remain at the current location. If the second spring 23 is fully relaxed, the movable part 3, i.e., the USB connector will remain at the location of a maximum rotation angle, for example, 180 degrees.

During the rotation of the movable part 3, to prevent the relative sliding between the first axle sleeve 17 and the first mounting hole 31, and to prevent the relative sliding between the first accommodation part 41 and the cam wheel 14, in the embodiment, the contour of the cross-section of the first axle sleeve 17 can be a polygon, e.g., a square, so that the first axle sleeve 17 can be closely mated with the first mounting hole 31 without the relative sliding; the contour of the cross-section of the cam wheel 14 can be a polygon, so that the cam wheel 14 can be tightly mated with the first accommodation part 41 without the relative sliding; the contour of the cross-section of the second axle sleeve 22 can be a polygon, so as to prevent the relative sliding between the second axle sleeve 22 and the second accommodation part 42 during the rotation of the movable part 3. It can be understood that, gluing and other clipping ways may be used for connecting the first axle sleeve 17 and the first mounting hole 31, connecting the first accommodation part 41 and the cam wheel 14, or connecting the second axle sleeve 22 and the second accommodation part 42. Alternatively, each pair of the first axle sleeve 17 and the first mounting hole 31, the first accommodation part 41 and the cam wheel 14, or the second axle sleeve 22 and the second accommodation part 42, can be made to be integral respectively, so as to prevent the relative sliding.

Further, if automatic rotation is not adopted, manual rotation can be used in the user device of the embodiment. For example, when the USB connector is in the status of 180 degrees, if it is necessary to manually rotate the USB connector to the status of 90 degrees, by applying an external force to the USB connector, the recessed wheel 15 can be caused to move toward the inner side of the first axle sleeve 17 along the first fixation axle 13. The recessed wheel 15 presses the first spring 16, so that the recessed wheel 15 separates from the cam wheel 14. At this time, the USB connector can be rotated. When the USB connector is rotated to 90 degrees, subject to the elastic force of the first spring 16, the recessed wheel 15 will again be tightly mated with the cam wheel 14. At this moment, since T2>T1, the USB connector can be kept at the position of 90 degrees. For another example, when the USB connector is in the status of 180 degrees, if it is necessary to manually rotate the USB connector to the status of 270 degrees, then the recessed wheel 15 can move toward the inner side of the first axle sleeve 17 along the first fixation axle 13. The recessed wheel 15 presses the first spring 16 to separate the recessed wheel 15 from the cam wheel 14. Then, the USB connector rotates. After the USB connector rotates 90 degrees, subject to the elastic force of the first spring 16, the recessed wheel 15 will again be tightly mated with the cam wheel 14. At this time, since T2>T1, the USB connector can be kept at the location of 270 degrees. Therefore, if no push button 11 is disposed, the user can realize pauses at different stop locations by manually rotating the USB connector.

In the embodiment, as two protrusion fields 142 are disposed on the cam wheel 14, and four recessed fields 151 are disposed on the recessed wheel 15, the rotation stop locations of the USB connector, with respect to the main body of the data card, in the embodiment can be divided as 90 degrees per stop location. It can be understood that, for the situation where six recessed fields 151 are disposed on the recessed wheel 15, the rotation stop locations of the USB connector, with respect to the main body of the data card, can be divided as 60 degrees per stop location. A person skilled in the art may specify the structure and the number of the protrusion fields 142 of the cam wheel 14 and the recessed fields on the recessed wheel 15 based on actual needs.

Further, the embodiment may set the recessed fields 151, which have different recess depths, on the recessed wheel 15. Therefore, when the user is pressing the push button and the recess depth is small, the movable part may be caused to rotate a certain angle. When the push button is further pressed down to increase the recess depth, the movable part may be caused to rotate another angle. For example, if four recessed fields 151 are evenly distributed on the circumference of the recessed wheel 15, two of the four recessed fields 151 with a larger recess depth are disposed to face each other, and another two of the four recessed fields 151 with a smaller recess depth are disposed to face each other. Therefore, when the depth resulted by pressing down the push button is relatively small, the movable part may rotate 90 degrees. When the user further presses the push button down, the movable part may rotate 180 degrees. Therefore, by designing recessed fields with different recess depths, the user can control the rotation angle of the movable part.

For the user device of the embodiment, by disposing a push button to control the switching control unit, the user may apply an external force to the switching control by pressing down the push button when it is necessary to turn the movable part, so that the friction that enables the movable part and the main body part to be stationary to each other is eliminated, and the rotation mode of the movable part is turned on. Then, under the influence of the pre-pressing elastic force applied by the rotation driver unit, the movable part can automatically rotate relative to the main body part, and the user does not need to mechanically move the movable part during the rotation. Alternatively, the user can manually overcome the friction between the protrusion fields of the cam wheel and the recessed fields of the recessed wheel, so as to enable the movable part to rotate relative to the main body part and control the stop locations of the movable part. Therefore, the embodiment enables the user device to have relatively good operability.

In the following, another embodiment is used to describe in detail solutions that the switching control unit and the rotation driver unit are disposed on the same side of the main body part of the user device. In the embodiment, a data card is also used as the user device for the description. In the embodiment, a first mounting hole and a second mounting hole are disposed on two sides of the movable part. A first accommodation part is disposed at the location of the main body part corresponding to the first mounting hole, and a second accommodation part is disposed at the location of the main body part corresponding to the second mounting hole. The switching control unit and the rotation driver unit are located on the same side of the main body part. The rotation driver unit is connected to the first accommodation part. The switching control unit is connected to the first mounting hole. The switching control unit is connected to the rotation driver unit. The second mounting hole and the second accommodation part are used for passing through and installing a cable. The movable part in the embodiment is similar to the movable part as shown in FIG. 4 of the above embodiment, and is not described in detail again herein.

Figure 13:
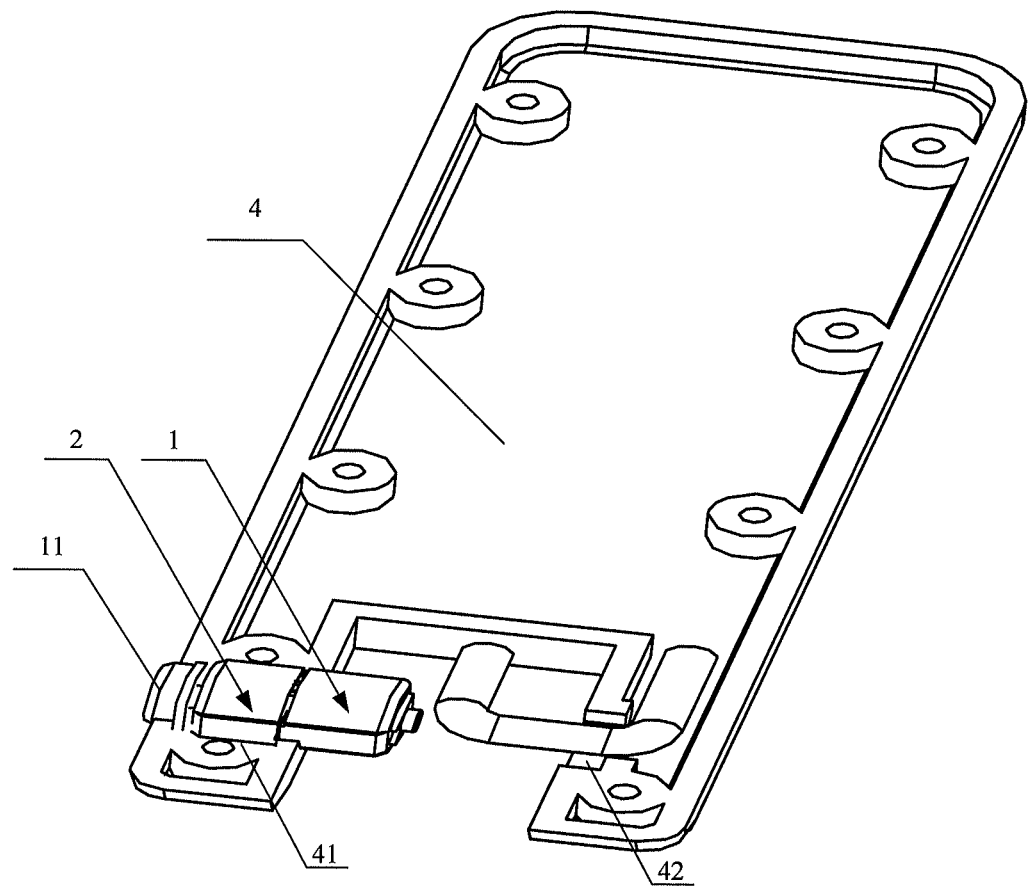
FIG. 13 is a partial structural view of the user device according to another embodiment of the present disclosure.
Figure 14:
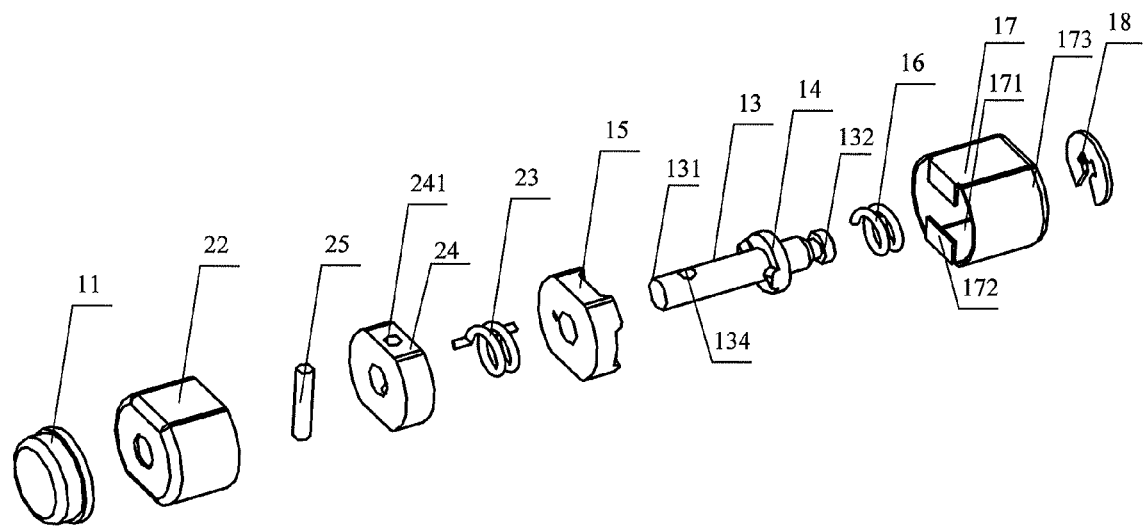
FIG. 14 is an exploded structural view of a switching control unit and a rotation driver unit in the user device as shown in FIG. 13.
Figure 15:
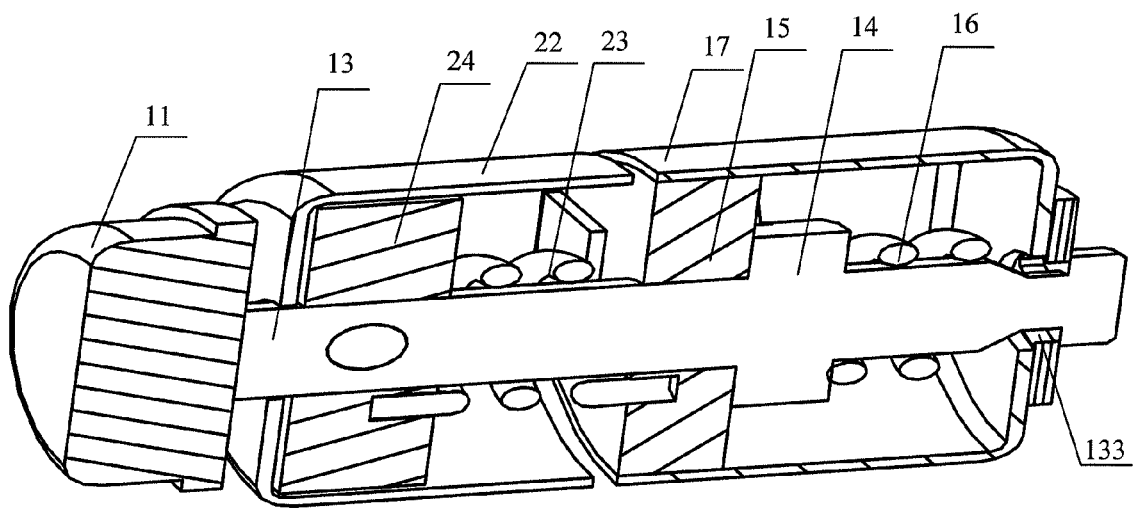
FIG. 15 is a cross-section structural view of the switching control unit and the rotation driver unit along a first fixed axis in the user device as shown in FIG. 13.
Figure 16:
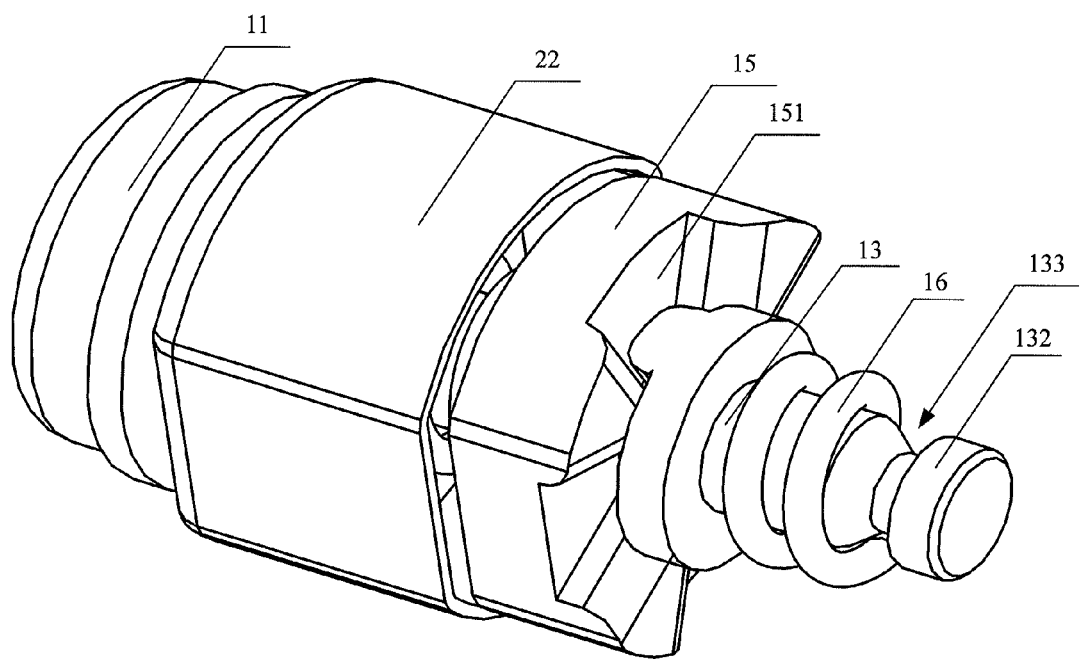
FIG. 16 is a structural view of a recessed part in the user device as shown in FIG. 13.

FIG. 13 is a partial structural view of the user device according to another embodiment of the present disclosure. FIG. 14 is an exploded structural view of a switching control unit and a rotation driver unit in the user device as shown in FIG. 13. FIG. 15 is a cross-section structural view of the switching control unit and the rotation driver unit along a first fixed axis in the user device as shown in FIG. 13. FIG. 16 is a structural view of a recessed part in the user device as shown in FIG. 13. As shown in FIGS. 13-16, in the embodiment, the switching control unit 1 comprises a switching element, such as a push button 11, a first fixation axle 13, a cam wheel 14, a recessed wheel 15, a first spring 16, a first axle sleeve 17 and a snap ring 18. A first termination part 131 and a second termination part 132 are disposed on two ends of the first fixation axle 13. At least two protrusion fields are provided on the cam wheel 14. Recessed fields 151 that are matched with the protrusion fields are disposed on the recessed wheel 15. A stopper part 172 is disposed at an opening end 171 of the first axle sleeve 17. The rotation driver unit 2 comprises a second axle sleeve 22, a second spring 23 and a slider 24. The snap ring 18, the first axle sleeve 17, the first spring 16, the cam wheel 14, the recessed wheel 15, the second spring 23, the slider 24, and the second axle sleeve 22 are penetrated and installed in sequence between the first termination part 131 and the second termination part 132. The snap ring 18 and a cover end 173 of the first axle sleeve 17 are fixed within the groove 133 of the second termination part 132, and the cover end 173 is spaced apart from the snap ring 18. The cam wheel 14 is fixed onto the first fixation axle 13. The protrusion fields and the recessed fields 151 are disposed to face each other and the stopper part 172 encloses the first spring 16, the cam wheel 14 and the recessed wheel 15 within the inner side of the first axle sleeve 17. The inner wall of the first axle sleeve 17 is tightly mated with the recessed wheel 15. The outer wall of the first axle sleeve is tightly mated with the first mounting hole 31 on the movable part 3 as shown in FIG. 4. One end of the second spring 23 is connected to the recessed wheel 15, another end of the second spring 23 is connected to the slider 24. The outer wall of the second axle sleeve 22 is tightly mated with the first accommodation part 41. The second axle sleeve 22 and the slider 24 are stationary with respect to each other in the direction of the circumference of the slider 24. The first termination part 131 extends outside of the main body part 4, and is adhered to the push button 11. When the movable part is shut off, the first spring 16 is in a compressed status and the second spring 23 is in a twisted status.

Further, to fix the slider 24 to the first fixation axle 13 so as to enable the slider 24 to make sure that the first fixation axle 13 can move to-and-fro along its axial direction, the embodiment can also insert fixation pins 25 in the first fixation hole 241 of the slider 24 and the second fixation hole 134 on the first termination part 131 of the first fixation axle 13, so as to enable the slider 24 to be perpendicular to the first fixation axle 13, and therefore the slider 24 can guide the first fixation axle 13 to move to-and-fro along the axial direction of the first fixation axle 13.

In use, the user can press the push button 11, then the first fixation axle 13, under the influence of an external force, can drive the cam wheel 14 to move toward the snap ring 18, so as to presses the first spring 16 to separate the recessed wheel 15 and the cam wheel 14. The separating the recessed wheel 15 and the cam wheel 14 is equivalent to turning on the rotation mode of the movable part. When the relative friction between the cam wheel 14 and the recessed wheel 15 is eliminated, the second spring 23 can be twisted under the influence of the pre-pressing elastic force. One end of the second spring 23 is connected to the slider 24, and another end of the second spring 23 is connected to the recessed wheel 15. Since the slider 24 and the second axle sleeve 22 are stationary with respect to each other in the direction of the circumference of the slider 24, the twisting force of the second spring 23 enables the recessed wheel 15 to drive the first axle sleeve 17 to rotate. Since the first axle sleeve 17 is also tightly mated with the movable part, the first axle sleeve 17 can enable the movable part to rotate. Until the second spring 23 is fully relaxed or the push button is released, the movable part stops rotating. It should be noted that a person skilled in the art can set the rotation angle of the movable part as required when the second spring 23 is fully relaxed, so as to satisfy the requirements of different user devices. For example, for the data card of the embodiment, the rotation angle of the USB connector can be set to 180 degrees when the second spring 23 is fully relaxed. However, for a handset, the rotation angle of the lid-turning part can be set to 160 degrees when the second spring 23 is fully relaxed.

After the push button is released, the cam wheel 14 is pressed by the first spring 16 and returns to the status that the cam wheel 14 is tightly mated with the recessed wheel 15. At this time, since a relative friction exists between the cam wheel 14 and the recessed wheel 15 when the cam wheel 14 is tightly mated with the recessed wheel 15, the movable part i.e., the USB connector of the data card will stop rotating and will be kept at the current position. If the second spring 23 is fully relaxed, the movable part i.e., the USB connector will also be kept at the position of the maximum rotation angle, such as 180 degrees.

In the embodiment, a cable electrically connecting the movable part and the main body part can pass through the second accommodation part 42 and the second mounting hole to connect to the print circuit board of the main body part 4. In this embodiment, a draw spring can be used as the first spring 16, while a torsion spring can be used as the second spring 23. In the embodiment, the USB connector of the data card can electrically connect with the print circuit board (PCB) within the housing by a cable. Further, the cable can connect the ground of the USB connector to the ground on the PCB. In addition, the first fixation axle is made of metal, and can also connect the ground of the USB connector to the ground on the PCB. Thus, simultaneous grounding of the USB connector of the data card and the PCB on right and left sides, i.e., a dual grounding, can be realized by the cable and the first fixation axle 13. A person skilled in the art can understand that, the embodiment can also take the form of single grounding, that is, the ground of the USB connector of the data card can be connected to the ground on the PCB by the cable or the first fixation axle 13.

In the embodiment, the recessed fields 151 can also be evenly distributed on the circumference of the recessed wheel 15, and are spaced apart from each other. The recessed fields can be configured to a first recessed field and a second recessed field with different recess depths, where the recess depth of the first recessed field is greater than the recess depth of the second recessed field. Therefore, when the user is pressing the push button and the recess depth is small, the movable part may be caused to rotate a certain angle. When the push button is further pressed down to increase the recess depth, the movable part may be caused to rotate another angle. For example, if four recessed fields 151 are evenly distributed on the circumference of the recessed wheel 15, two of the four recessed fields 151 with a larger recess depth are disposed to face each other, and another two of the four recessed fields 151 with a smaller recess depth are disposed to face each other. Therefore, when the depth resulted by pressing down the push button is relatively small, the movable part can rotate 90 degrees. When the user further presses the push button down, the movable part can rotate 180 degrees. Therefore, by designing recessed fields with different recess depths, the user can control the rotation angle of the movable part.

For the operation of the user device of the embodiment, when it is necessary to turn the movable part, the user may apply an external force to the switching control unit by pressing down the push button, so that the friction that enables the movable part and the main body part to be stationary to each other is eliminated, and the rotation mode of the movable part is turned on. Then, under the influence of the pre-pressing elastic force applied by the rotation driver unit, the movable part can automatically rotate relative to the main body part, and the user does not need to mechanically move the movable part during the rotation. Alternatively, the user can manually overcome the friction between the protrusion fields of the cam and the recessed fields of the recessed wheel, so as to enable the movable part to rotate relative to the main body part and control the stop locations of the movable part. Therefore, the embodiment enables the user device to have relatively good operability. In addition, the user device of the embodiment can provide rotation angles of two or more stop locations for the user, thus enhance the user experience.

Finally, it should be noted that, the above embodiments are merely used for illustrating the present disclosure and are not intended to constitute limitations thereto. Though the present disclosure has been described in detail with reference to the aforesaid embodiments, a person of ordinary skill in the art should understand that, modifications of the aforesaid embodiments or equivalent replacements of some technical features thereof still can be made, the modifications and replacements will not cause the nature of corresponding solutions to depart from the protection scope of the solutions of various embodiments of the present disclosure.

The invention claimed is:

1. A user device, comprising: a main body part, a movable part electrically connected to the main body part, and a switching control unit and a rotation driver unit for co-axially connecting the main body part and the movable part, wherein:
   the switching control unit is configured to eliminate a friction that fixes the main body part relative to the movable part, subject to an external force, to turn on the rotation mode of the movable part
   the rotation driver unit is configured to apply a pre-pressing elastic force to the movable part when the switching control unit turns on the rotation mode of the movable part, to rotate the movable part relative to the main body part;
   the pre-pressing elastic force is less than the friction;
   the switching control unit comprises a switching element and an arrester element, wherein the arrester element comprises a pair of cam and recessed wheel that are tightly mated with each other;
   the cam is fixed to one of the main body part and the movable part directly or is fixed to one of the main body part and the movable part through other physical structure;
   the recessed wheel is fixed onto a first fixation axle, one end of the first fixation axle passes through the cam and contacts with the switching element exposed outside of the main body part, and another end of the first fixation axle passes through a first spring and is fixed onto another one of the main body part and the movable part directly or is fixed onto another one of the main body part and the movable part through other physical structure;
   the rotation driver unit comprises a second spring, wherein two ends of the second spring are respectively fixed onto the main body part and the movable part directly or through other physical structures;
   a first mounting hole and a second mounting hole are disposed on two sides of the movable part, a first accommodation part is disposed at location on the main body part corresponding to the first mounting hole and a second accommodation part is disposed at location on the main body part corresponding to the second mounting hole; and
   the switching control unit and the rotation driver unit are disposed on the same side of the main body part, the rotation driver unit is connected to the first accommodation part, the switching control unit is connected to the first mounting hole, and the switching control unit is connected to the rotation driver unit, and the second mounting hole and the second accommodation part are used for passing through and installing a cable.

2. The user device of claim 1, wherein, a first mounting hole and a second mounting hole are disposed on two sides of the movable part, a first accommodation part is disposed on the main body part corresponding to the first mounting hole and a second accommodation part is disposed on the main body part corresponding to the second mounting hole;

the switching control unit and the rotation driver unit are disposed on two sides of the main body part, the switching control unit connects to the first accommodation part and the first mounting hole, and the rotation driver unit connects to the second accommodation part and the second mounting hole.

3. The user device of claim 2, wherein, the switching element comprises a push button, the arrester element is penetrated and installed in the first accommodation part and the first mounting hole, and the arrester element further comprises at least one push rod, a first axle sleeve and a snap ring, a first termination part and a second termination part are disposed on two ends of the first fixation axle, a through hole and at least two protrusion fields are disposed on the cam wheel, and recessed fields that are matched with the protrusion fields are disposed on the recessed wheel;

the cam wheel, the recessed wheel, the first spring, the first axle sleeve, and the snap ring are penetrated and are installed in sequence between the first termination part and the second termination part, and the snap ring is fixed onto the second termination part, the protrusion fields and the recessed fields are configured to face each other, the outer radius of the first axle sleeve is greater than the outer radius of the recessed wheel, one end of the push rod is adhered to the push button, another end of the push rod passes through the through hole and adheres to the recessed wheel, the first axle sleeve is tightly mated with the first mounting hole, the cam wheel is tightly mated with the first accommodation part;

the first spring is in a compressed status when the movable part is shut off, so that the cam wheel and the recessed wheel are tightly mated with each other, subject to the elastic force of the first spring.

4. The user device of claim 3, wherein, the rotation driver unit further comprises a second fixation axle that is hollow and a second axle sleeve;

the second fixation axle is penetrated and installed in the second mounting hole, one end of the second fixation axle is adhered to the inner side of the movable part, another end of the second fixation axle is disposed with the second spring and the second axle sleeve, wherein the second axle sleeve is installed onto and circumferentially covers the second spring, one end of the second spring is connected to the second axle sleeve, another end of the second spring is connected to the inner side of the second mounting hole, the second axle sleeve is tightly mated with the second accommodation part, and the second spring is twisted when the movable part is shut off.

5. The user device of claim 1, wherein, the arrester element further comprises, a first axle sleeve and a snap ring, a first termination part and a second termination part are disposed on two ends of the first fixation axle, at least two protrusion fields are disposed on the cam wheel, recessed fields that are matched with the protrusion fields are disposed on the recessed wheel, and a stopper part is disposed on an opening end of the first axle sleeve;

the rotation driver unit further comprises a second axle sleeve and a slider;

the snap ring, the first axle sleeve, the first spring, the cam wheel, the recessed wheel, the second spring, the slider, and the second axle sleeve are penetrated and installed in sequence between the first termination part and the second termination part, the snap ring and a cover end of the first axle sleeve are fixed in a groove of the second termination part, and the cover end is separated from the snap ring, the cam wheel is fixed onto the first fixation axle, the protrusion fields and the recessed fields are configured to face each other, and the stopper part encloses the first spring, the cam wheel and the recessed wheel within the inner side of the first axle sleeve, the inner wall of the first axle sleeve is tightly mated with the recessed wheel, and the outer wall of the first axle sleeve is tightly mated with the first mounting hole;

one end of the second spring is connected to the recessed wheel, another end of the second spring is connected to the slider, the outer wall of the second axle sleeve is tightly mated with the first accommodation part, the second sleeve is stationary relative to the slider in the direction of the circumference of the slider;

the first termination part extends outside of the main body part and is adhered to the switching element;

when the movable part is shut off, the first spring is in a compressed status and the second spring is in a twisted status.

6. The user device of claim 5, wherein, the user device further comprises a fixation pin, a first fixation hole that is used for penetration is disposed on the slider, in the direction perpendicular to the first fixation axle, a second fixation hole coaxial with the first fixation hole is disposed on the first termination part of the first fixation axle, the fixation pin passes through the first fixation hole and the second fixation hole and fixes the slider onto the first fixation axle.

7. The user device of claim 5, wherein, the number of the protrusion fields is 2, the number of the recessed fields is 4 or 6.

8. The user device of claim 7, wherein, the recessed fields comprise first recessed units and second recessed units that are spaced apart and distributed on the recessed wheel, and the recess depth of the first recessed unit is greater than the recess depth of the second recessed unit.

9. The user device of claim 1, wherein, the user device is a lid-turning handset, the movable part is a lid-turning part of the lid-turning handset.

10. The user device of claim 1, wherein the user device is a data card, the movable part is a USB connector of the data card, the switching control unit is made of metal, the USB connector is connected to a print circuit board within the housing of the user device through a cable.

11. The user device of claim 10, wherein a ground of the USB connector is connected to the ground on the print circuit through the cable or the switching control unit.

12. The user device of claim 1, wherein the user device is a U-disk, the movable part is a connector of the U-disk.

13. The user device of claim 1, wherein the switching control unit comprises a switching element and an arrester element, wherein the arrester element comprises a pair of cam and recessed wheel that are tightly mated with each other; the recessed wheel is fixed to one of the main body part and the movable part directly or is fixed to one of the main body part and the movable part through other physical structure; the cam wheel is fixed onto a first fixation axle, one end of the first fixation axle passes through the recessed wheel and contacts with the switching element exposed outside of the main body part, and another end of the first fixation axle passes through the first spring and is fixed onto another one of the main body part and the movable part directly or is fixed onto another one of the main body part and the movable part through other physical structure;

the rotation driver unit comprises a second spring, wherein two ends of the second spring are respectively fixed onto the main body part and the movable part directly or through other physical structures.

14. The user device of claim 13, wherein, a first mounting hole and a second mounting hole are disposed on two sides of the movable part, a first accommodation part is disposed on the main body part corresponding to the first mounting hole and a second accommodation part is disposed on the main body part corresponding to the second mounting hole;

the switching control unit and the rotation driver unit are disposed on two sides of the main body part, the switching control unit connects to the first accommodation part and the first mounting hole, and the rotation driver unit connects to the second accommodation part and the second mounting hole.

15. The user device of claim 14, wherein, the switching element comprises a push button, the arrester element is penetrated and installed in the first accommodation part and the first mounting hole, and the arrester element further comprises at least one push rod, a first axle sleeve and a snap ring, a first termination part and a second termination part are disposed on two ends of the first fixation axle, a through hole and at least two protrusion fields are disposed on the cam wheel, and recessed fields that are matched with the protrusion fields are disposed on the recessed wheel;

the cam wheel, the recessed wheel, the first spring, the first axle sleeve, and the snap ring are penetrated and are installed in sequence between the first termination part and the second termination part, and the snap ring is fixed onto the second termination part, the protrusion fields and the recessed fields are configured to face each other, the outer radius of the first axle sleeve is greater than the outer radius of the recessed wheel, one end of the push rod is adhered to the push button, another end of the push rod passes through the through hole and adheres to the recessed wheel, the first axle sleeve is tightly mated with the first mounting hole, the cam wheel is tightly mated with the first accommodation part;

the first spring is in a compressed status when the movable part is shut off, so that the cam wheel and the recessed wheel are tightly mated with each other, subject to the elastic force of the first spring.

16. The user device of claim 14, wherein, the rotation driver unit further comprises a second fixation axle that is hollow and a second axle sleeve;

the second fixation axle is penetrated and installed in the second mounting hole, one end of the second fixation axle is adhered to the inner side of the movable part, another end of the second fixation axle is disposed with the second spring and the second axle sleeve, wherein the second axle sleeve is installed onto and circumferentially covers the second spring, one end of the second spring is connected to the second axle sleeve, another end of the second spring is connected to the inner side of the second mounting hole, the second axle sleeve is tightly mated with the second accommodation part, and the second spring is twisted when the movable part is shut off.

17. The user device of claim 13, wherein, a first mounting hole and a second mounting hole are disposed on two sides of the movable part, a first accommodation part is disposed at location on the main body part corresponding to the first mounting hole and a second accommodation part is disposed at location on the main body part corresponding to the second mounting hole;

the switching control unit and the rotation driver unit are disposed on the same side of the main body part, the rotation driver unit is connected to the first accommodation part, the switching control unit is connected to the first mounting hole, and the switching control unit is connected to the rotation driver unit, and the second mounting hole and the second accommodation part are used for passing through and installing a cable.

18. The user device of claim 17, wherein, the arrester element further comprises, a first axle sleeve and a snap ring, a first termination part and a second termination part are disposed on two ends of the first fixation axle, at least two protrusion fields are disposed on the cam wheel, recessed fields that are matched with the protrusion fields are disposed on the recessed wheel, and a stopper part is disposed on an opening end of the first axle sleeve;

the rotation driver unit further comprises a second axle sleeve and a slider;

the snap ring, the first axle sleeve, the first spring, the cam wheel, the recessed wheel, the second spring, the slider, and the second axle sleeve are penetrated and installed in sequence between the first termination part and the second termination part, the snap ring and a cover end of the first axle sleeve are fixed in a groove of the second termination part, and the cover end is separated from the snap ring, the cam wheel is fixed onto the first fixation axle, the protrusion fields and the recessed fields are configured to face each other, and the stopper part encloses the first spring, the cam wheel and the recessed wheel within the inner side of the first axle sleeve, the inner wall of the first axle sleeve is tightly mated with the recessed wheel, and the outer wall of the first axle sleeve is tightly mated with the first mounting hole;

one end of the second spring is connected to the recessed wheel, another end of the second spring is connected to the slider, the outer wall of the second axle sleeve is tightly mated with the first accommodation part, the second sleeve is stationary relative to the slider in the direction of the circumference of the slider;

the first termination part extends outside of the main body part and is adhered to the switching element;

when the movable part is shut off, the first spring is in a compressed status and the second spring is in a twisted status.

19. A user device, comprising: a main body part, a movable part electrically connected to the main body part, and a switching control unit and a rotation driver unit for co-axially connecting the main body part and the movable part, wherein:

the switching control unit is configured to eliminate a friction that fixes the main body part relative to the movable part, subject to an external force, to turn on the rotation mode of the movable part;

the rotation driver unit is configured to apply a pre-pressing elastic force to the movable part when the switching control unit turns on the rotation mode of the movable part, to rotate the movable part relative to the main body part; and a first mounting hole and a second mounting hole are disposed on two sides of the movable part, a first accommodation part is disposed at location on the main body part corresponding to the first mounting hole and a second accommodation part is disposed at location on the main body part corresponding to the second mounting hole; and the switching control unit and the rotation driver unit are disposed on the same side of the main body part, the rotation driver unit is connected to the first accommodation part, the switching control unit is connected to the first mounting hole, and the switching control unit is connected to the rotation driver unit, and the second mounting hole and the second accommodation part are used for passing through and installing a cable.

* * * * *